United States Patent
Frerichs

(10) Patent No.: US 8,211,258 B2
(45) Date of Patent: Jul. 3, 2012

(54) METHOD AND DEVICE FOR PRODUCING A TREAD FOR A VEHICLE TIRE

(75) Inventor: Udo Frerichs, Langenhagen (DE)

(73) Assignee: Continental Aktiengesellschaft, Hannover (DE)

( * ) Notice: Subject to any disclaimer, the term of this patent is extended or adjusted under 35 U.S.C. 154(b) by 860 days.

(21) Appl. No.: 12/245,863

(22) Filed: Oct. 6, 2008

(65) Prior Publication Data

US 2009/0050257 A1   Feb. 26, 2009

Related U.S. Application Data

(63) Continuation of application No. PCT/EP2007/001429, filed on Feb. 20, 2007.

(30) Foreign Application Priority Data

Apr. 5, 2006  (DE) .......................... 10 2006 015 910

(51) Int. Cl.
  *B29D 30/60*  (2006.01)
  *B60C 19/08*  (2006.01)
(52) U.S. Cl. ................... 156/117; 152/152.1; 152/209.5; 156/129; 156/130
(58) Field of Classification Search .................. 156/117, 156/127, 129, 130, 397; 152/152.1, 209.5
  See application file for complete search history.

(56) References Cited

U.S. PATENT DOCUMENTS 1,424,134 A * 7/1922 Litchfield ..................... 156/112

(Continued)

FOREIGN PATENT DOCUMENTS

EP  0798142 A1  10/1997

(Continued)

OTHER PUBLICATIONS

ISR, dated Jun. 11, 2007.

*Primary Examiner* — Geoffrey L Knable
(74) *Attorney, Agent, or Firm* — Laurence A. Greenberg; Werner H. Stemer; Ralph E. Locher

(57) ABSTRACT

A tread for a vehicle tire, such as a pneumatic vehicle tire, is provided with an electrically conducting layer axially inside a portion of a first, radially outer rubber layer of the tread. The electrically conductive layer extends from a second, radially inner rubber layer of the tread on the radially inner side of the tread rubber material up to a ground contact surface of the tread. The rubber material of the electrically conducting layer and the rubber material of the radially inner rubber layer of the tread have a higher electrical conductivity than the rubber material of the radially outer rubber layer. First, a first rubber layer of higher electrical conductivity is formed over the circumference of the vehicle tire, and an accumulation of rubber material of higher electrical conductivity is built to extend over the circumference of the vehicle tire in a position in the region of axial extent of the layer of rubber material of higher electrical conductivity that is intended to extend up to the ground contact surface in the finished vehicle tire. Then the accumulation of rubber material is shaped to form a web, radially outwards from the inner rubber layer, and in its cross-sectional planes containing the axis of the vehicle tire a predetermined cross-sectional contour. Then the outer rubber layer of lower electrical conductivity is built on the radially outer surface of the first rubber layer, which adjoins the shaped web of rubber material of higher conductivity axially on both sides, and the tread profile is shaped and vulcanized.

26 Claims, 8 Drawing Sheets

U.S. PATENT DOCUMENTS

| | | | | |
|---|---|---|---|---|
| 4,283,241 | A * | 8/1981 | Hollmann | 156/117 |
| 5,942,069 | A * | 8/1999 | Gerresheim et al. | 156/128.1 |
| 2001/0035255 | A1* | 11/2001 | Sergel et al. | 156/130 |
| 2002/0007893 | A1* | 1/2002 | Koyama et al. | 152/548 |
| 2004/0013754 | A1* | 1/2004 | Hirai et al. | 425/31 |
| 2006/0048884 | A1* | 3/2006 | Kudo et al. | 156/130.3 |

FOREIGN PATENT DOCUMENTS

| | | |
|---|---|---|
| EP | 0838353 B1 | 12/2001 |
| JP | 2003326614 A | 5/2002 |
| WO | 2005108048 A1 | 11/2005 |

\* cited by examiner

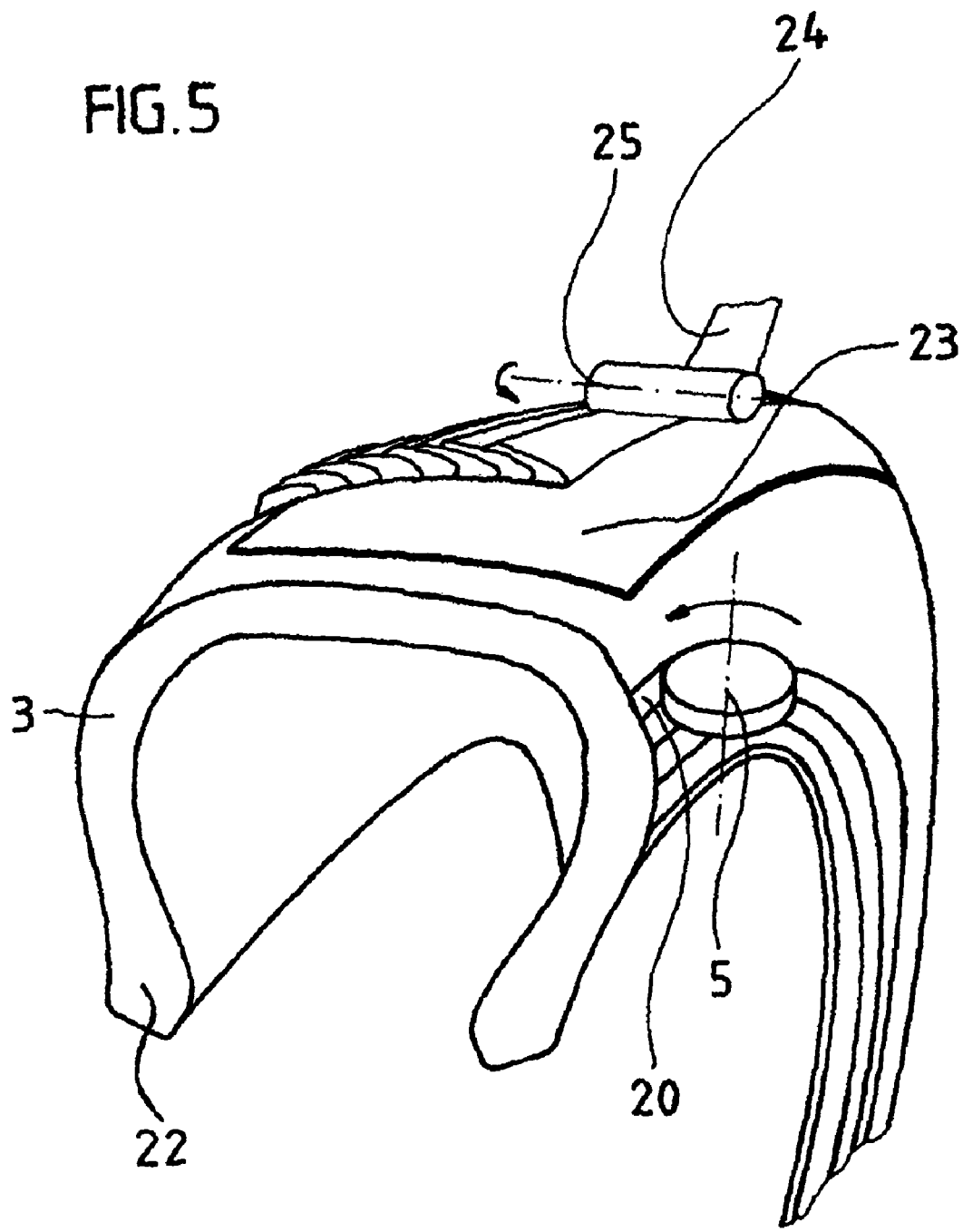

METHOD AND DEVICE FOR PRODUCING A TREAD FOR A VEHICLE TIRE

CROSS-REFERENCE TO RELATED APPLICATION

This is a continuation, under 35 U.S.C. §120, of copending international application PCT/EP2007/001429, filed Feb. 20, 2007, which designated the United States; this application also claims the priority, under 35 U.S.C. §119, of German patent application No. DE 10 2006 015 910.1, filed Apr. 5, 2006; the prior applications are herewith incorporated by reference in their entirety.

BACKGROUND OF THE INVENTION

Field of the Invention

The invention relates to a method for producing a tread for a vehicle tire—in particular a pneumatic vehicle tire—which is provided with an electrically conducting layer, which is arranged axially inside a portion of a first, radially outer rubber layer of the tread that is formed from a first rubber material, wherein the electrically conductive layer extends from a second, radially inner rubber layer of the tread of a second rubber material on the radially inner side of the tread rubber material up to a ground contact surface of the tread and wherein both the rubber material of the electrically conducting layer and the rubber material of the second, radially inner rubber layer of the tread have a higher electrical conductivity than the rubber material of the first, radially outer rubber layer.

A method for producing a pneumatic vehicle tire of this type is known, for example, from European patent EP 1 175 992 B1 (cf. U.S. Patent Application Publication No. US 2002/0007893 A1). There, an electrically conductive layer is formed axially inside a portion of a first radially outer rubber layer formed from a cap mixture, wherein the electrically conductive layer extends from the second rubber layer, formed from a base mixture radially inside the outer rubber layer, as a web of narrow cross section radially outward up to the ground contact surface of the tread. The layer forming the narrow web is produced by a narrow ribbon-shaped strip of rubber being wound around the second rubber layer in a number of turns arranged radially one on top of the another. The congruent turns of the ribbon-shaped rubber strip are in each case formed with the same axial width. Subsequently, the rubber material for forming the first rubber layer is built up successively on both sides of the web, wherein a dependable connection between the web and the rubber material for forming the first rubber layer also has to be produced without any formation of air pockets. Adequately high pressing forces are required for this. In order that the web cannot inadmissibly tilt out of its position in the process, the rubber ribbon must be made as wide as possible. However, being made wide has the effect of reducing the contact surface area of the first rubber layer of the vehicle tire, formed from the cap mixture, with respect to the surface of the roadway that is important for the running characteristics.

SUMMARY OF THE INVENTION

It is accordingly an object of the invention to provide a method for producing a tread for a vehicle tire which overcomes the above-mentioned disadvantages of the heretofore-known devices and methods of this general type and which makes possible, simple, dependable production of a tread possible for a vehicle tire—in particular a pneumatic vehicle tire—which is provided with an electrically conducting layer, which is arranged axially inside a portion of a first, radially outer rubber layer of the tread that is formed from a first rubber material, wherein the electrically conductive layer extends from a second, radially inner rubber layer of the tread of a second rubber material on the radially inner side of the tread rubber material up to a ground contact surface of the tread and wherein both the rubber material of the electrically conducting layer and the rubber material of the second, radially inner rubber layer of the tread have a higher electrical conductivity than the rubber material of the first, radially outer rubber layer, for which it is possible to design the running properties in an optimized manner in spite of good electrical dischargeability from the second rubber layer into the surface of the roadway.

With the foregoing and other objects in view there is provided, in accordance with the invention, a method of producing a tread for a vehicle tire.

The tread having a radially outer rubber layer formed of a first rubber material; a radially inner rubber layer formed of a second rubber material; an electrically conductive layer disposed axially inside a portion of the radially outer rubber layer, the electrically conductive layer extending from the radially inner rubber layer up to a ground contact surface of the tread; and a rubber material of the electrically conductive layer and the second rubber material of the radially inner rubber layer having a higher electrical conductivity than the first rubber material of the radially outer rubber layer.

The method according to the invention comprises the following steps:

building up a first rubber layer of a relatively higher electrical conductivity, formed to extend over a circumference of the vehicle tire and having a radially outer surface, and building up an accumulation of rubber material of a relatively higher electrical conductivity, formed to extend over the circumference of the vehicle tire and positioned in a region of axial extent of the layer of rubber material of higher electrical conductivity intended to extend up to the ground contact surface in the finished vehicle tire;

subsequently shaping the accumulation of rubber material of higher electrical conductivity to form a web extending over the circumference of the vehicle tire, radially outward from the radially outer surface of the first rubber layer, and having, in its cross-sectional planes that contain an axis of the vehicle tire, a predetermined cross-sectional contour;

subsequently building up a second rubber layer from a material of relatively lower electrical conductivity on the radially outer surface of the first rubber layer, adjoining the shaped web of rubber material axially on both sides; and shaping and vulcanizing a tread profile of the vehicle tire.

In other words, the objects are achieved according to the invention by the method for producing a tread for a vehicle tire—in particular a pneumatic vehicle tire—which is provided with an electrically conducting layer, which is arranged axially inside a portion of a first, radially outer rubber layer of the tread that is formed from a first rubber material, wherein the electrically conductive layer extends from a second, radially inner rubber layer of the tread of a second rubber material on the radially inner side of the tread rubber material up to a ground contact surface of the tread and wherein both the rubber material of the electrically conducting layer and the rubber material of the second, radially inner rubber layer of the tread have a higher electrical conductivity than the rubber material of the first, radially outer rubber layer, according to the features of claim 1 that has the following steps:

building up of a first rubber layer of higher electrical conductivity, formed such that it extends over the circumference of the vehicle tire, and building up of an accumulation of rubber material of higher electrical conductivity, formed such that it extends over the circumference of the vehicle tire and is arranged in a positioned manner in the region of axial extent of the layer of rubber material of higher electrical conductivity that is intended to extend up to the ground contact surface in the finished vehicle tire, followed by shaping of the accumulation of rubber material of higher electrical conductivity to form a web which is made to extend over the circumference of the vehicle tire, radially outward from the radially outer surface of the first rubber layer, and has in its cross-sectional planes that contain the axis of the vehicle tire a predetermined cross-sectional contour, followed by building up of a second rubber layer of lower electrical conductivity on the radially outer surface of the first rubber layer, which adjoins the shaped web of rubber material of higher conductivity axially on both sides, and shaping and vulcanizing of the tread profile.

Being formed in this way makes it possible in a simple, reliable manner to build up and provide electrically conductive rubber material required for the forming of the web on the first, likewise electrically conductive rubber layer and, once it has been dependably provided on the first rubber layer, to shape the layer of rubber material of higher electrical conductivity individually in dependence on the individual requirements of the production of the pneumatic tire that is to be produced. The rubber material of the second rubber layer is then built up against the shaped web. By being formed on the first rubber layer and before the second rubber layer is applied, the web can be individually formed in such a way that a stable buildup of the layers of the tread rubber can be dependably ensured along with an optimized contact surface area of the tire with respect to the surface of the roadway.

In accordance with an added feature of the invention, the forming of the accumulation of rubber material of higher electrical conductivity to form a web which is made to extend over the circumference of the vehicle tire radially outward from the radially outer surface of the first rubber layer takes place with a cross-sectional contour formed such that it tapers from the inside outward in the radial sense—in particular continuously—in its cross-sectional planes that contain the axis of the vehicle tire is particularly advantageous. This allows very great stability of the web with respect to displacement and tilting during the building up of the second rubber layer against the web to be achieved in the tire along with a very narrow contact surface area of the web with respect to the surface of the roadway.

In accordance with an additional feature of the invention, the tapering of the cross-sectional contour profile takes place with a taper increasing degressively from the inside outward in the radial sense is particularly advantageous. This allows very great stability of the web with respect to displacement and tilting during the building up of the second rubber layer against the web to be achieved in the tire along with a very narrow contact surface area of the web with respect to the surface of the roadway.

In accordance with another feature of the invention, the forming of the accumulation of rubber material of higher electrical conductivity to form a web which is made to extend over the circumference of the vehicle tire radially outward from the radially outer surface of the first rubber layer takes place with, in its cross-sectional planes that contain the axis of the vehicle tire, a cross-sectional contour profile of at least one—in particular both—axial side faces of the web that is respectively widened conically from the outside inward in the axial sense toward the middle of the web is particularly advantageous.

In accordance with a further feature of the invention, the building up of the accumulation of rubber material of higher electrical conductivity takes place during the building up of the first rubber layer of higher electrical conductivity, formed such that it extends over the circumference of the vehicle tire, is particularly advantageous. This makes simple continuous production—for example by continuous winding—possible with few operations.

In accordance with again an added feature of the invention, the building up of the accumulation of material and the building up of the first rubber layer, formed such that it extends over the circumference of the vehicle tire, takes place with the same rubber material of higher electrical conductivity is particularly advantageous. This makes particularly simple continuous production—for example by continuous winding—possible with few operations.

In accordance with again an additional feature of the invention, the building up takes place on a building surface of a building body that can be driven in a rotational manner about an axis of rotation; wherein the building body is driven in a rotational—in particular controlled—manner during the building up is particularly simple and advantageous. As a result, the rubber material can be laid on with high accuracy and defined tensile stress.

In accordance with again another feature of the invention, the building body is a building drum, is particularly advantageous.

In accordance with again a further feature of the invention, the building body is a toroidal building core is particularly advantageous. The built-up tread rubber already corresponds substantially to the contour in the later tire.

In accordance with yet an added feature of the invention, the building surface is formed substantially cylindrically in relation to the axis of rotation is particularly advantageous.

In accordance with yet an additional feature of the invention, the building surface is toroidal is particularly advantageous.

In accordance with yet another feature of the invention, the building surface is part of a solid surface is particularly advantageous.

In accordance with yet a further feature of the invention, the building surface is part of an elastic surface—in particular of an inflated bladder—is particularly advantageous.

In accordance with an added feature of the invention, the building up of the first rubber layer takes place by winding on a ribbon-shaped rubber strip with a number of turns arranged axially next to one another or at least partly axially overlapping is particularly advantageous. This makes an area-covering formation of the first rubber layer possible by reliable contact in a simple way and, with deliberate overlapping, additionally makes exact setting of the volume distribution of the tread rubber along its axial extent possible with few operations while ensuring the area-covering distribution of the rubber.

In accordance with an additional feature of the invention, the building up of the second rubber layer of lower electrical conductivity takes place by winding on a ribbon-shaped rubber strip with a number of turns arranged axially next to one another or at least partly axially overlapping is particularly advantageous. This makes an area-covering formation of the second rubber layer possible by reliable contact in a simple way and, with deliberate overlapping, additionally makes exact setting of the volume distribution of the tread rubber along its axial extent possible with few operations while ensuring the area-covering distribution of the rubber.

In accordance with another feature of the invention, the building up of the accumulation of material takes place by winding on a ribbon-shaped rubber strip with a number of turns is particular advantageous. This makes exact setting of the volume distribution of the accumulation of material possible with only one operation. In addition, it makes pre-contouring of the accumulation of material possible.

In accordance with a further feature of the invention, the first rubber layer of electrically increased conductivity is built up radially outside a built-up—in particular toroidally built-up—carcass ply, in particular of a radial type of construction, is particularly advantageous.

In accordance with again an added feature of the invention, the first rubber layer of electrically increased conductivity is built up radially outside a breaker belt ply built up radially outside a built-up—in particular toroidally built-up—carcass ply—in particular a breaker belt ply assembly comprising one or more breaker belt plies and a breaker belt bandage—is particularly advantageous.

In accordance with again an additional feature of the invention, the shaping of the accumulation of material, a shaping body—in particular a contoured shaping body—is brought up laterally to the flank of the accumulation of material that is respectively to be shaped and the latter is thereby deformed until it has the desired contour of the flank of the web to be shaped is particularly advantageous. This makes individually desired contouring possible in a simple way with minimal work.

In accordance with again another feature of the invention, the shaping body is a baffle along which the accumulation of material is moved after it has been brought up to said material is particularly advantageous. This makes simple configuration and positioning of the shaping body possible.

In accordance with again a further feature of the invention, the shaping body is a forming roller or forming roll along which the accumulation of material is moved after it has been brought up to said material is particularly advantageous. This makes individually desired contouring possible in a particularly simple and reliable way with minimal work.

In accordance with a concomitant feature of the invention, the shaping body is a forming ring which is brought up to the accumulation of material coaxially and radially outside the first rubber layer and uses an annular—particular contoured—stop to deform the accumulation of material over the entire circumference of the first rubber layer is particularly advantageous. This makes individually desired contouring with exact material alignment over the entire circumference possible in a simple way. In this case, springing back of the rubber material of the accumulation of material can be avoided during the entire rotating movement by the axial supporting force that is made to extend over the circumference.

With the above and other objects in view there is also provided, in accordance with the invention, a device for producing a tread of a vehicle tire according to the above outlined method. The device comprises:

a building body rotatably mounted about an axis of rotation for building up rubber layers;

a drive connection for rotating the building body about the axis of rotation;

means for positioning and laying rubber material on the building body; and means for shaping built-up accumulations of rubber material on the building body and configured to form therefrom a web of rubber material extending from the radially inner rubber layer to the ground contact surface of the tread and having a higher electrical conductivity than the radially outer rubber layer.

In other words, the device for carrying out the novel method has a building body mounted rotatably about an axis of rotation for building up rubber layers, a drive connection for the rotation—in particular controlled rotation—of the building body about its axis of rotation, means for the positionable laying—in particular in a controlled manner—of rubber material on the building body, and means for shaping built-up accumulations of rubber material on the building body.

Other features which are considered as characteristic for the invention are set forth in the appended claims.

Although the invention is illustrated and described herein as embodied in method for producing a tread for a vehicle tire, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 5 shows a representation of the process of winding on a rubber strip to create a tire sidewall and to create a tread rubber;

DETAILED DESCRIPTION OF THE INVENTION

Figure 1:
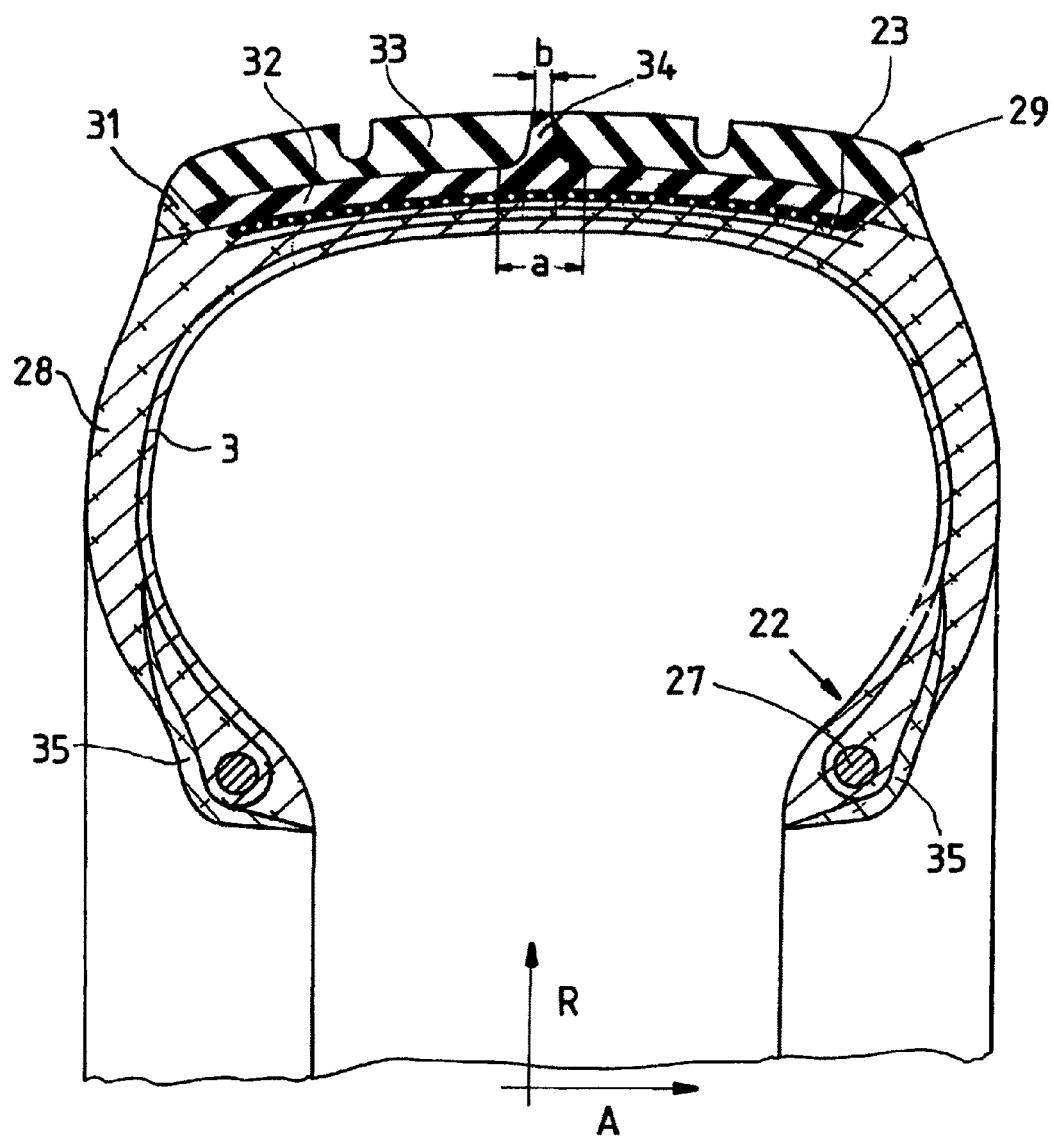
FIG. 1 shows a pneumatic vehicle tire in cross-sectional representation.

Referring now to the figures of the drawing in detail and first, particularly, to FIG. 1 thereof, which illustrates an exemplary buildup of a pneumatic vehicle tire, in which a first carcass ply of a carcass 3 of a radial type of construction reaches around a bead core 27 with a bead filler (not represented any more specifically) in a right-hand bead region 22 formed for fastening the pneumatic vehicle tire on a rim, outside an air-impermeable inner layer over the right-hand shoulder region and the zenith plane to the bead core 27 with a bead filler that is formed in the left-hand bead region 22 and around which the ply is laid in the conventional way. A second carcass ply of the carcass 3, which is likewise made to extend from the side of the tire represented on the right in FIG. 1 to the side represented on the left, is laid in a conventional way over the first carcass ply. In a conventional way, a bead strip of a known type (not represented any more specifically), a bead reinforcer of a known type (not represented any more specifically) and a flange profile 35 are formed in the bead region 22, and a sidewall rubber material 28, reaching from the flange profile 35 into the shoulder region, is laid on. Arranged outside the carcass plies of a radial type of construction, a number of breaker belt plies of a breaker belt 23 with steel cords embedded in rubber reach over the circumference of the tire. Additionally formed on the breaker belt plies of the breaker belt 23, between the breaker belt plies 23 and a tread rubber 29, is a bandage ply of a known type of the breaker belt 23 with strengthening supports aligned in the circumferential direction. In the shoulder strip, shoulder strips 31 are additionally laid on in a known way. The completion of the tire buildup is formed in a known way by a profiled tread rubber 29.

The tread rubber 29 is built up in a known way from a radially outer rubber ply (cap) 33 and a radially inner rubber ply (base) 32.

The thickness of the radially inner rubber ply (base) 32 is at least 0.6 mm. By way of example, it is 2 to 3 mm.

The radially outer rubber ply (cap) 33 is formed in a known way with a tread rubber mixture that is suitable for a cap, with a high proportion of silica, and consequently with a relatively low electrical conductivity. The radially inner rubber ply (base) 32 is formed in a known way with a tread rubber mixture that is suitable for a base, with a high proportion of carbon black, consequently with a relatively high electrical conductivity in comparison with the tread rubber mixture that is used for the cap.

As represented in FIG. 1, to reduce the risks of electrostatic charges that can occur during driving, there is a web 34 that is made to extend over the entire circumference of the pneumatic vehicle tire, radially from the radially inner rubber ply (base) 32 through the radially outer rubber ply (cap) 33 to the radially outer peripheral surface of the pneumatic vehicle tire, forming the contact surface with the surface of the road. The web 34 is formed from the same tread rubber mixture from which the radially inner rubber ply (base) 32 is formed, with a high proportion of carbon black, and consequently with a relatively high electrical conductivity in comparison with the tread rubber mixture used for the cap. In the axial direction A of the pneumatic vehicle tire, the web 34 extends in its sectional plane with the radially outer peripheral surface of the radially inner rubber ply (base) 32 over a length of extent a and steadily decreases in its axial extent outward along its radial extent and, in the sectional plane with the radially outer peripheral surface of the pneumatic vehicle tire that forms the contact surface with the road surface, reaches an axial extent over a length of extent b, where b<a.

The cross section of the web in a sectional plane that is represented in FIG. 1 and contains the axis of the pneumatic vehicle tire has in one embodiment a contour profile with a progression of the amount of its axial extent that decreases degressively along its radial extent from the inside outward in the radial sense.

Figure 2:
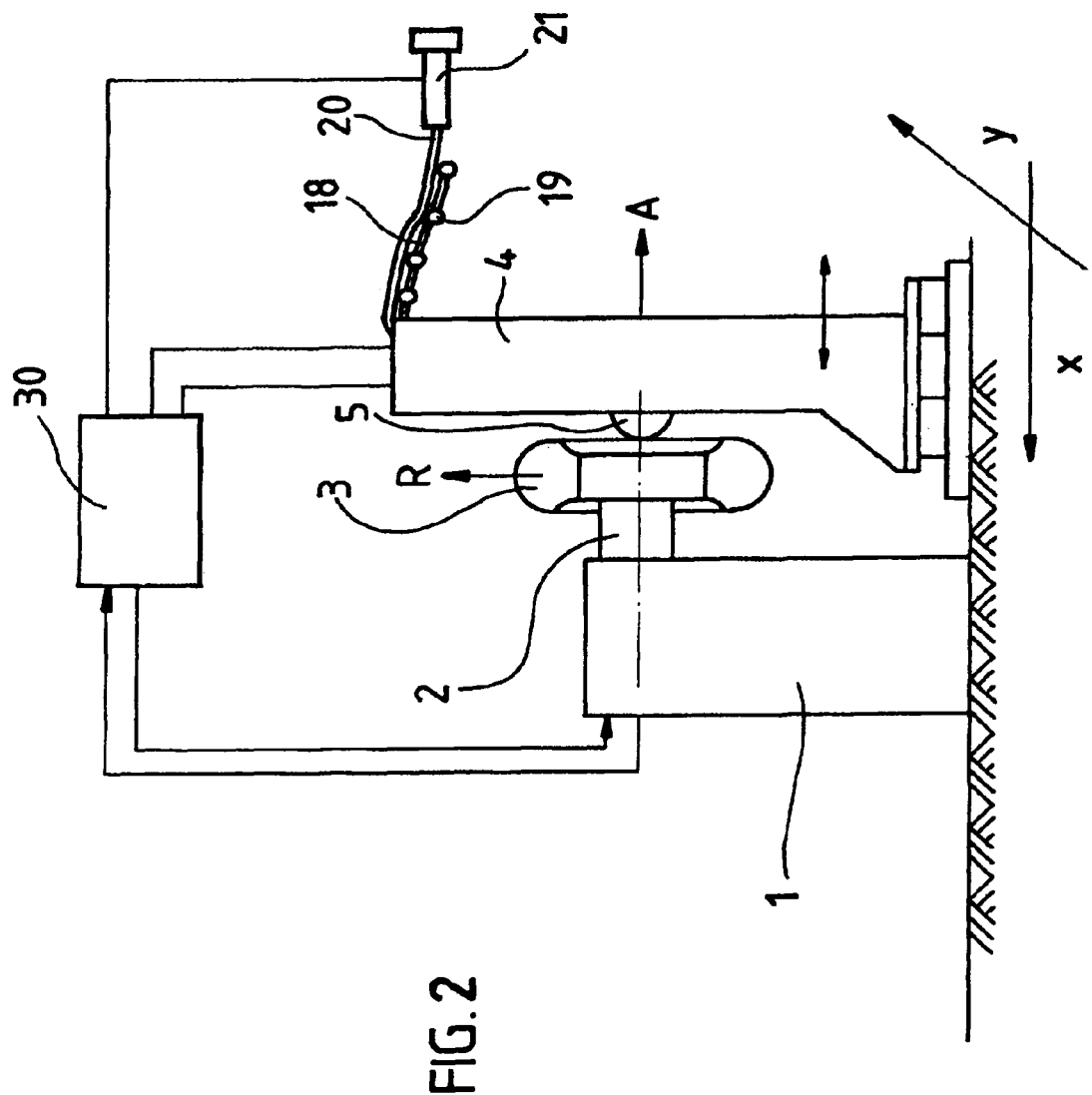
FIG. 2 shows a schematic representation of a station for winding strip-shaped rubber material onto a green tire, with a green tire built up on a drum and a winding head.

To produce the pneumatic vehicle tire, an unvulcanized green tire without a tread rubber—as represented in FIG. 2—is built up on a clamping head 2, which is rotatably mounted in a framework 1 and driven in a rotationally controlled manner by means of a control unit 30, coaxially with respect to the clamping head 2 and is fastened.

The green tire comprises—as represented in FIG. 5—the carcass 3 formed in a conventional way, comprising one or more plies (not represented) of strengthening supports embedded in rubber, which are made to extend axially from bead region 22 to bead region 22 of the green tire and respectively wrapped around the bead core (not represented any more specifically for purposes of simplification) with a bead filler built up on it. In a conventional way, a bead strip of a known type (not represented any more specifically), a bead reinforcer of a known type (not represented any more specifically) and a flange profile (not represented in FIG. 5 for purposes of simplification) are formed in the bead region 22. A breaker belt 23 with a number of breaker belt plies (not represented in FIG. 5 for purposes of simplification) and one or more bandage plies built up on said breaker belt reach over the circumference of the tire, arranged outside the carcass plies of a radial type of construction.

The green tire is toroidally formed and fastened on the clamping head 2.

Figure 4:
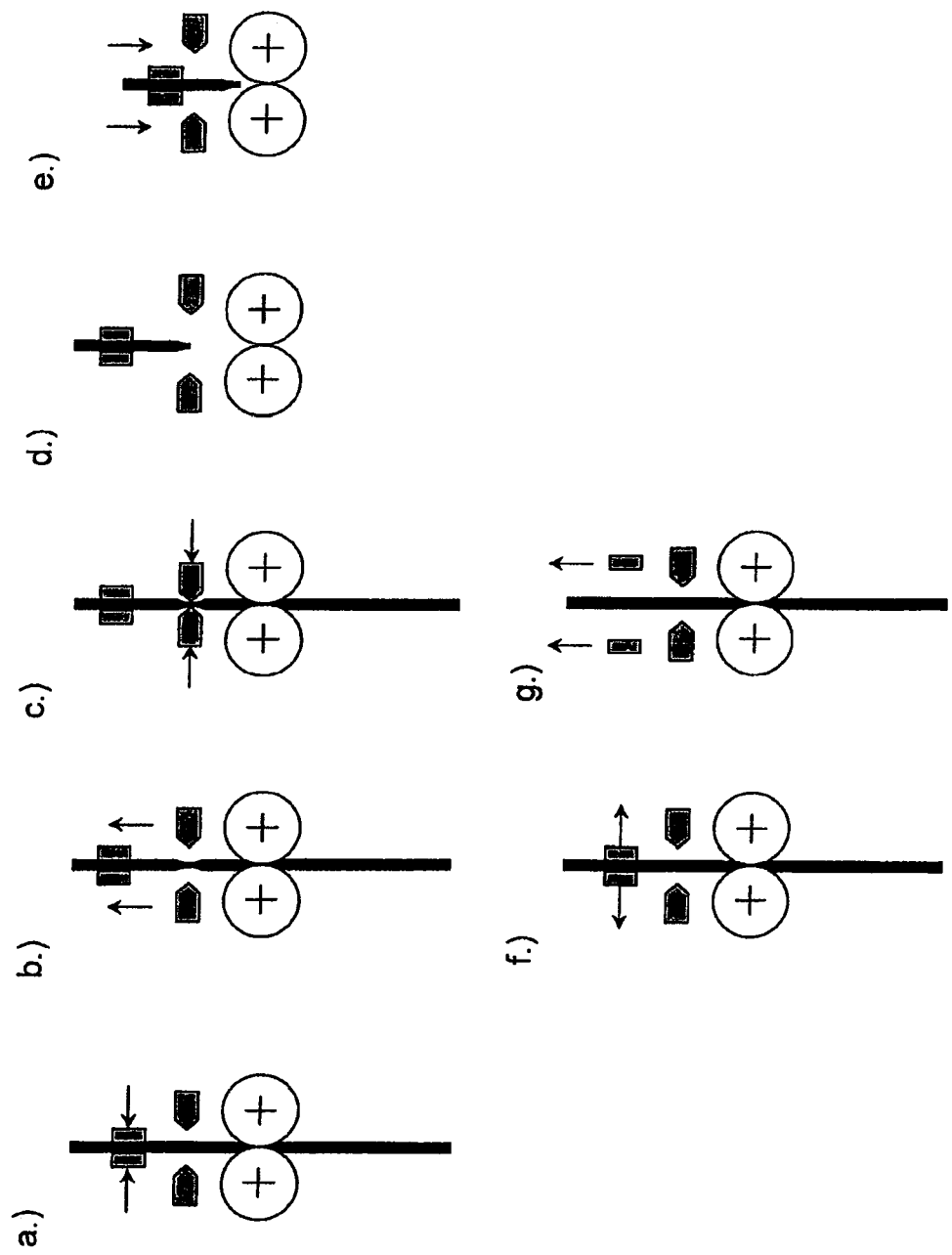
FIG. 4 shows a simplified schematic representation of the winding head with method steps represented in FIG. 3*a* to FIG. 3*g* to explain the way in which rubber material is supplied and cut to length.

In FIG. 2, a winding head 4 is additionally represented. For winding onto a new tire sidewall, rubber material 20 in the form of a round cord or ribbon is drawn out of an extruder 21 of a known type over a roller carrier that is fastened to the winding head 4 and has conveying rollers 19 mounted rotatably one behind the other in the conveying direction in a frame 13 of the roller carrier, and following that through between two holding plates 16 and 17, which are respectively fastened to a reciprocating piston 14 or 15 of a pneumatically or hydraulically actuable reciprocating piston cylinder, actuated in a controlled manner by the control unit 30, in a frame 13 mounted displaceably in the winding head 4, following that through between two reciprocating pistons of a reciprocating piston cylinder of a cutting device 9 that can respectively be actuated hydraulically or pneumatically and are actuated in a controlled manner by the control unit 30, each provided with a reciprocating piston cutter 10 or 11, and through between two calender rolls 7 and 8 of a forming calender 6 that are arranged downstream in the conveying direction, interact with each other and are driven in a rotationally controlled manner by the control device 30, said rubber material being drawn by the calender rolls, and conveyed further over deflecting rollers of a known type onto a downstream laying roller 5. By means of the laying roller 5, the ribbon-shaped material shaped by the profiled calender rolls 7 and 8 of the forming calender 6 is rolled up under pressure—as can be seen in FIG. 1 and FIG. 4—onto the carcass of the green tire between the bead region 22 and the tread of the tire to be produced.

Figure 3:
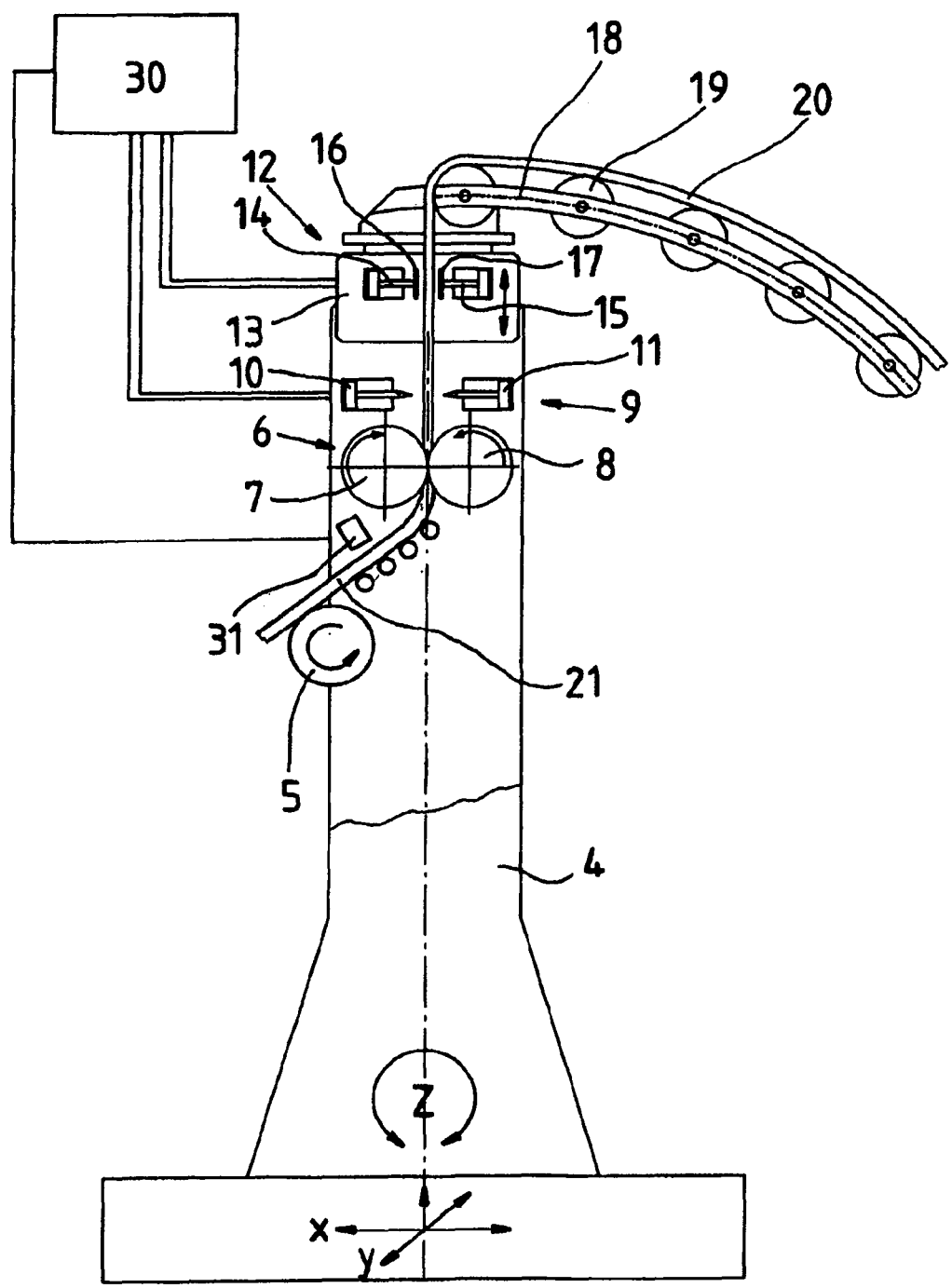
FIG. 3 shows a schematic sectional representation of the winding head.

For this purpose, firstly the winding head 4 is displaced parallel to the axis of rotation of the clamping head 2 in the x direction represented in FIGS. 2 and 3 to the extent that the laying roller 5 comes into contact with the green tire. By stepless displacement under the control of the control unit 30 and by means of a known displacing device (not represented) in the coordinate direction x parallel to the axis of rotation of the clamping head 2 and the coordinate direction y perpendicular to the axis of rotation of the clamping head 2, the winding head 4 can in this case be respectively positioned in such a way that the laying roller 5 is in contact with the green tire 3 with the desired pressure. In addition—as represented in FIG. 3—the winding head 4 can be steplessly pivoted in a controlled manner about axis z aligned perpendicularly to the x-y plane in a known way that is not represented, so that the winding head 4 can be respectively positioned by means of the control unit 30 such that the laying roller 5 respectively assumes with its peripheral surface the alignment desired for winding on with respect to the surface of the green tire.

As a result—as represented in FIG. 5—the rubber material 20 shaped by the calender rolls 7 and 8 is continuously wound onto the carcass from the inside outward in the radial sense during the controlled rotation of the green tire about the axis of rotation of the clamping head 2. The individual turns may in this case be wound out next to one another or else, if need be, also overlapping one another. This is possible by corresponding advancement of the movement of the winding head 4 in the x-y plane along the contour of the toroidal green tire. If need be, for this purpose the alignment of the laying roller 5 in relation to the surface of the contour of the toroidal green tire is continuously corrected by controlled pivoting of the winding head 4 about the z axis.

If required, in an embodiment that is not represented, the laying roller 5 is additionally formed such that it is steplessly displaceable in a controlled manner in the z direction. In the case of such an embodiment, the winding-on position of the laying roller 5 with respect to the green tire can also be set in an individually controlled manner in the z direction or changed during the winding.

As soon as the rubber material in the form of a round cord or ribbon that is drawn between the reciprocating piston cutters 10 and 11 has reached such a length that it corresponds to the winding-on length desired for the production of the sidewall of the green tire, a cutting process is initiated by control unit 30. For this purpose, the reciprocating pistons of the reciprocating piston cutters 10 and 11 are pneumatically or hydraulically displaced toward each other in the respective reciprocating piston cylinder and, as a result, the rubber material in the form of a round cord or ribbon is cut up by the reciprocating piston cutters 10 and 11 acting from both sides.

As soon as the end of the cut-off rubber strip that is created by the cutting process has been pressed by the laying roller 5 onto the sidewall of the green tire, the winding head is removed from the green tire by controlled displacement in the x-y plane.

For winding onto a new tire sidewall, a new green tire is mounted on the clamping head 2 and the winding head 4 is in turn brought up to the green tire in a controlled manner to the extent that the winding process for building up the tire sidewall can be initiated.

To introduce the beginning of a rubber strand in the form of a round cord or ribbon newly created by the extruder between the calender rolls 7 and 8, firstly the reciprocating pistons 14 and 15 are moved hydraulically or pneumatically under the control of the control unit 30 toward each other to the extent that the holding plates 16 and 17 aligned parallel to the rubber ribbon 20 respectively come into frictional contact with the rubber ribbon 20 and firmly hold the rubber ribbon 20 between them. After that, under the control of the control unit 30, the frame 13, which is mounted displaceably in the winding head 4 parallel to the conveying direction of the rubber ribbon 20, is moved in the conveying direction toward the calender rolls 7 and 8 of the forming calender 6, so that the rubber ribbon 20 is introduced between the calender rolls 7 and 8 and is drawn in by the calender rolls 7 and 8 through the calender gap between the calender rolls 7 and 8. This state is represented in FIG. 4a. After that—as can be seen in FIG. 4f—the contact between the holding plates 16 and 17 and the rubber strip is in turn brought to an end by hydraulic actuation of the reciprocating pistons 14 and 15 perpendicularly to the conveying direction of the rubber ribbon 20 away from the rubber material. After that—as represented in FIG. 4g—the frame 13 is in turn raised into its starting position.

For cutting, firstly the reciprocating pistons 14 and 15 are moved hydraulically or pneumatically under the control of the control unit 30 toward each other to the extent that the holding plates 16 and 17 aligned parallel to the rubber ribbon 20 respectively come into frictional contact with the rubber ribbon 20 and firmly hold the rubber ribbon 20 between them. After that, under the control of the control unit 30, the frame 13, which is mounted displaceably in the winding head 4 parallel to the conveying direction of the rubber ribbon 20, is moved at the conveying speed of the calender rolls 7 and 8 in the conveying direction toward the calender rolls 7 and 8 of the forming calender 6, so that the rubber ribbon 20 is led in the direction of the calender gap formed between the calender rolls 7 and 8, wherein the rubber ribbon 20 continues to be drawn in by the calender rolls 7 and 8 through the calender gap between the calender rolls 7 and 8. This state is represented in FIG. 4a. After that, the frame 13 is moved back again in a controlled manner in the counter conveying direction. The rubber ribbon 20 respectively clamped between the holding plates 16 and 17 and between the calender rolls 7 and 8 is thereby stretched between the two clamping positions. This produces a constriction of the rubber ribbon 20. The position of the reciprocating piston cutters 10 and 11 in the winding head 4 is chosen in this case such that they are positioned in the region of the expected thinnest cross section of the stretched material. This is represented in FIG. 4b. After that—as can be seen in FIG. 4c—the reciprocating piston cutters 10 and 11 are moved hydraulically or pneumatically in a controlled manner toward each other, so that the rubber ribbon 20 is severed in the region of the thinnest cross section. The end of the preceding strip material is conveyed further to the green tire. As can be seen in FIG. 4d, the beginning of the next strip material is also of a tapered form and—as can be seen in FIG. 4e—is introduced into the calender gap between the calender rolls 7 and 8 by displacing the frame 13 in the conveying direction. After that—as can be seen in FIG. 4f—the contact between the holding plates 16 and 17 and the rubber strip is in turn brought to an end by hydraulic actuation of the reciprocating pistons 14 and 15 perpendicularly to the conveying direction of the rubber ribbon 20 away from the rubber material. After that—as represented in FIG. 4g—the frame 13 is in turn raised into its starting position.

As can be seen in FIG. 4c, the end of the preceding strip is also of a tapered form. The tapering of the beginning and end of the rubber strip makes it possible when winding onto the surface of the green tire at the beginning and at the end to obtain a uniform transition with the surface of the green tire.

To determine the length of the rubber strip material for correctly cutting to the length to be wound on, in one embodiment the length is determined from the available data on the conveying speed, which is determined for example from the rotational speed of the calender rolls 7 and 8 or is measured directly, and the conveying time. In an alternative embodiment—as represented in FIG. 2—the length of the conveyed rubber strip material is measured by means of sensors 31 formed in the winding head for determining a rubber ribbon of a known type and these data are passed on to the control unit for processing. The sensors are arranged for example between the cutting device with reciprocating cutters 10 and 11 and the forming calender 6 with the calender rolls 7 and 8 or else—as represented in FIG. 2—the calender in the conveying direction.

As represented in FIG. 5, the tread rubber mixtures for building up the radially inner rubber ply (base) 32 and the radially outer rubber ply (cap) 33 of the tread rubber 29 of the tire are also wound on by means of a winding head 4—as represented above—from a rubber strip produced in a correspondingly identical way, over a laying roller 25 of the winding head 4. Represented in this respect in FIG. 5 is an embodiment in which the rubber strip is wound onto a breaker belt 23 of a known type built up onto the carcass of the green tire. Instead of the radial movement along the sidewall contour, the laying takes place with a controlled axial movement along the contour of the pneumatic vehicle tire in the region of the tread rubber. During the controlled rotation of the green tire about the axis of rotation of the clamping head 2, the rubber material 20 shaped by the calender rolls 7 and 8 is continuously wound onto the breaker belt 23 in the axial direction A along the axial extent of the breaker belt. The individual turns may in this case be wound out next to one another or else, if need be, also overlapping one another. This is possible by corresponding advancement of the movement of the winding head 4 in the x-y plane along the contour of the toroidal green tire. If need be, for this purpose the alignment of the laying roller 5 in relation to the surface of the contour of the toroidal green tire is continuously corrected by controlled pivoting of the winding head 4 about the z axis.

It is possible to form different thicknesses of the built-up plies of the tread rubber and/or of the sidewall respectively by controlled changing of the advancement of the winding head along the tire contour to be wound onto, and consequently by deliberate different overlapping of the individual turns of the wound strip material formed next to one another.

For this purpose, the contouring and thickness distribution can in addition be influenced in a controlled manner by deliberately changing the angle of alignment of the laying roller 5 or the laying roller 25 in relation to the surface of the green tire.

It is similarly possible to wind the built-up plies of the tread rubber or the sidewall on from a number of such rubber strips. In this case, these rubber strips may, if need be, be of different rubber material and/or differently shaped. The different shaping takes place for example by modified calender rolls 7 of the forming calender.

In one embodiment, the shoulder strip 31 is wound on together with the sidewall as a joint component, in another embodiment the shoulder strip 31 is wound on as an independent component following the formation of the sidewall 28 and the tread rubber 29.

Figure 6A:
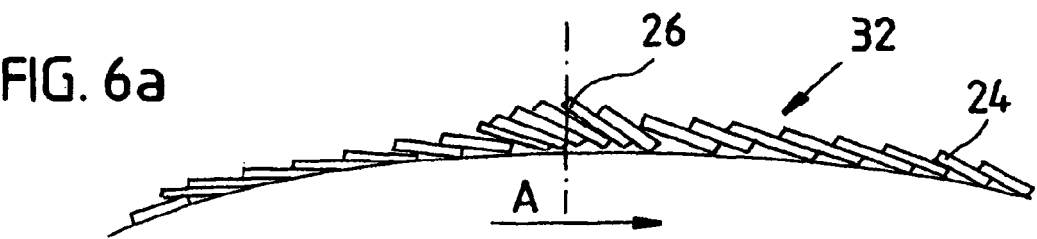
FIG. 6*a* shows a cross section of the wound-on base of a tread rubber with an accumulation of material.

FIG. 6a schematically shows the winding pattern of a base ply 32 formed in this way by winding from a rubber ribbon 24 produced from a base mixture of high electrical conductivity—for example with a high proportion of silica. In the case of this exemplary embodiment, the base ply 32 is produced from left to right over the entire axial extent of the breaker belt plies (not represented), with overlapping of the individual neighboring turns, lying next to one another, of the rubber ribbon 24 wound on helically about the axis of the green tire. As this happens, controlled changing of the advancement of the winding head in the axial direction A of the green tire has the effect in the axial region of extent of the web 34 that is wanted in the tread rubber of the finished vehicle tire of an increased winding density of the rubber ribbon 24 in comparison with the other axial regions of extent, and consequently the effect of forming an accumulation of material 26.

Figure 6B:
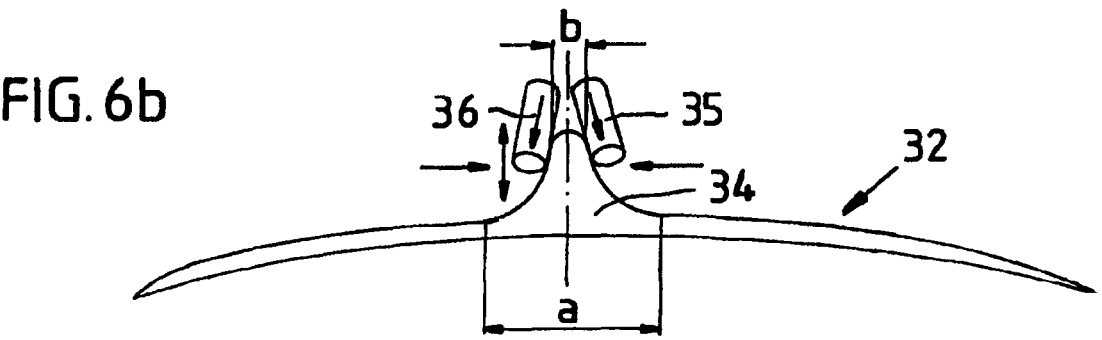
FIG. 6*b* shows a representation to explain the shaping of a web from the accumulation of material in a first embodiment.

Subsequently—as represented in FIG. 6b—two contoured rollers 35 and 36, which are respectively mounted rotatably in the framework 1 of the winding head 4, for example on levers that are movable in a controlled manner (not represented any more specifically), or fed in by a suitable separate device of a known type that is not represented, are moved in the axial direction toward the accumulation of material 26 from both axial sides of the accumulation of material 26 until they respectively come into contact with the accumulation of material 26. In a way corresponding to the desired contour of the web 34 to be formed, the contoured rollers 35 and 36 are then moved further in a controlled manner axially inward and radially outward and at the same time driven in a controlled manner about their axis of rotation. The pressure exerted on the accumulation of material 26 by the driven rollers 35 and 36 brings about deliberate deformation of the accumulation of material 26. The controlled axial movement in the axial and radial directions of the green tire with simultaneous controlled rotational movement of the built-up green tire about its axis has the effect that the accumulation of material is deformed over the entire circumferential extent of the green tire into the desired cross-sectional contour of the web 34 that is to be formed. The drive of the contoured rollers 35 and 36 about their own axis makes further deliberate influencing of the distribution of material possible.

In another embodiment, the contoured rollers 35 and 36 are formed such that they are merely mounted in a freely rotatable manner and not themselves driven. Here, their rotational movement takes place merely by means of the frictional contact with the accumulation of material 26.

The cross-sectional contour of the contoured rollers 35 and 36 is formed individually to the corresponding requirements of the desired contouring of the web 34.

In a special embodiment, the solid angles of the axis of rotation of the contoured rollers 35 and 36 in relation to the axis of rotation of the green tire is likewise changed in a controlled manner.

For the sake of simplicity, the contours of the individual turns of the radially inner ply 32 (base) are not represented in FIG. 6b, but merely the enveloping outer contour of the radially inner ply 32 (base) and the cross-sectional contour of the web 34 shaped by the contoured rollers 35 and 36.

The web 34—in the form represented in FIG. 6b—is formed in the sectional plane with the radially outer peripheral surface of the radially inner ply 32 (base) with its cross-sectional contour having an axial length of extent a. The cross-sectional contour of the web 34 is formed along the radial extent of the green tire from the inside outward in the radial sense with a degressively decreasing length of extent. In the radial position of the maximum radially outer extent of the web 34, the latter extends in the axial extent only over an axial length of extent b, where b<a.

Figure 6C:
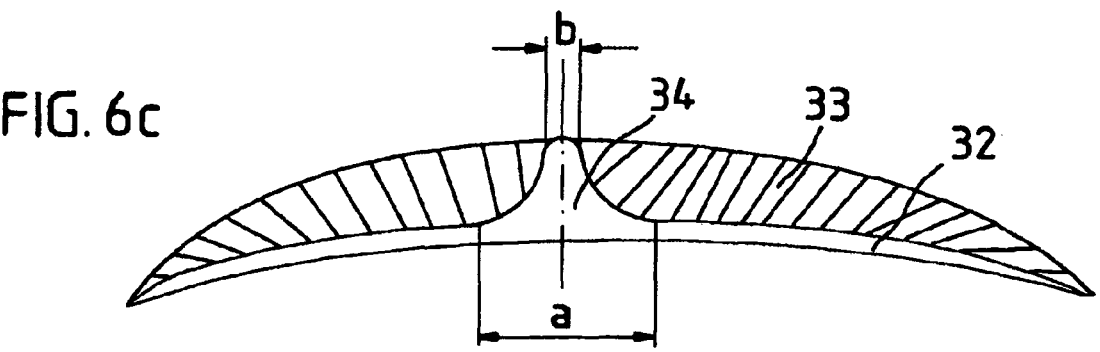
FIG. 6*c* shows a representation of the tread rubber with a wound-on base and cap.

As can be seen in FIG. 6c, following the shaping of the web 34 by means of the contoured rollers 35 and 36, the radially outer rubber ply (cap) 33 is wound onto the radially inner rubber ply (base) 32 by winding on a ribbon-shaped rubber strip 24 of a rubber mixture that is suitable for the cap, of high electrical conductivity—for example with a high proportion of carbon black—respectively with overlapping of the neighboring turns from the axial outside, from the respective tire shoulder side, to the axial inside, toward the web 34, helically about the axis of rotation of the green tire, wherein the radially outer contour of the radially outer ply (cap) 33 of the tread rubber is created by controlled overlapping of the respectively neighboring turns. With its radially outer peripheral contour in the radially outer position of its extent, with the axial length of extent b, the web 34 is in the same radial position as the two axially adjacent wound-on radially outer regions of extent of the radially outer tread rubber ply (cap) 33, with its radially outer adjacent peripheral contour, and forms an integrated part of the radially outer peripheral contour of the radially outer tread rubber ply (cap) 33.

Figure 7:
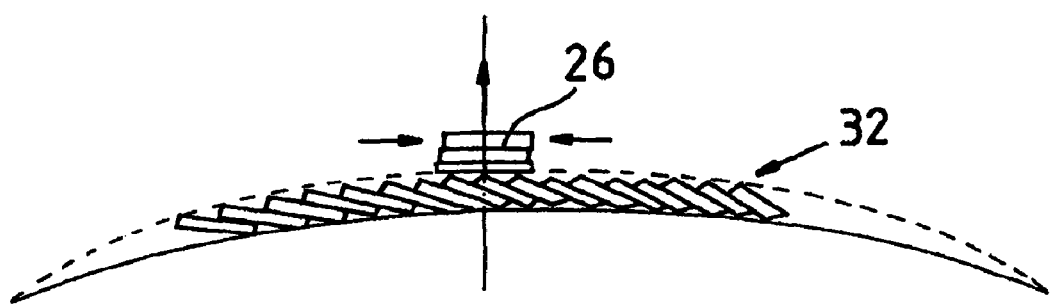
FIG. 7 shows a representation to explain the shaping of a web from the accumulation of material in a second embodiment.
Figure 8:
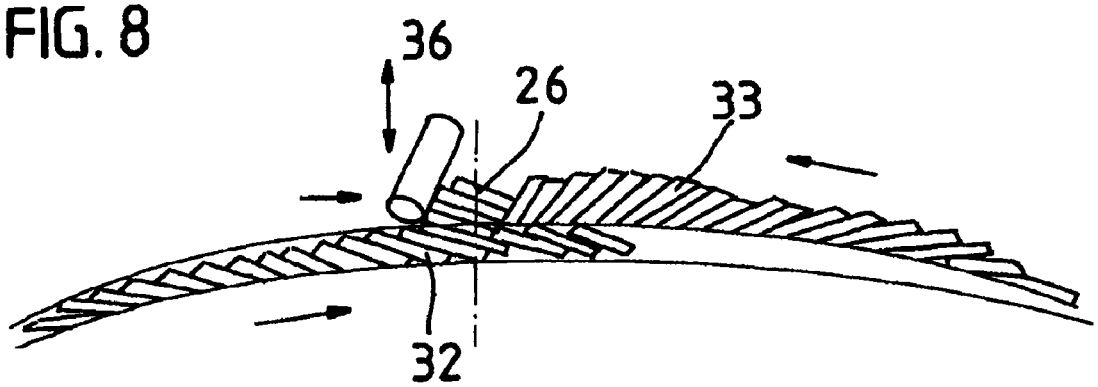
FIG. 8 shows a representation to explain the shaping of a web from the accumulation of material in a third embodiment.

In FIG. 7, an alternative way of producing the accumulation of material 26 to form the web 34 is represented. When produced in this way, the radially inner tread rubber ply (base) 32 is laid on in the axial direction of extent as in the exemplary embodiment of FIG. 6a, right through from one shoulder to the other shoulder, from a ribbon-shaped rubber strip 24 of a suitable base mixture, with controlled overlapping of the respectively axially neighboring turns. Following that, in the axial region of extent of the desired formation of a web 34, a ribbon-shaped rubber strip 24 is built up in the form of a number of turns wound on spirally radially one on top of the other. The shaping to form the web 34 takes place in the way explained with reference to FIG. 6b. In FIG. 8, a further alternative for producing the accumulation of material 26 and the web 34 is represented. Here, as represented in the example of FIG. 7, firstly the radially inner tread rubber ply (base) is built up from a ribbon-shaped rubber strip 24 of a suitable base mixture by helical winding on about the axis of the green tire in the axial direction from left to right of the entire axial extent of the breaker belt, with overlapping of the respectively neighboring turns. In a second step, a ribbon-shaped rubber strip 24 of a suitable cap mixture is wound on helically about the axis of the green tire from the right-hand side, from the right side of the breaker belt represented in FIG. 8, inward in the axial direction to the position of the desired web formation, with overlapping of the respectively neighboring turns, to form the right-hand cap side. After that, a ribbon-shaped rubber strip 24 of the base mixture is built up on the built-up radially inner tread rubber ply (base) 32 in the position of the desired web formation in direct axial contact with the neighboring turn of the built-up side of the radially outer tread rubber ply (cap) 33 in the form of a number of spirally wound-on turns arranged radially one on top of the other. As described with respect to FIG. 6b, from the axial side of the accumulation of material 26 that is facing away from the already wound-on side of the radially outer tread rubber ply (cap) 33 and has a contoured roller 36, the contoured roller 36 is moved in a controlled manner against the accumulation of material 26 and the accumulation of material 26 is consequently deformed into the desired web contour by the forces acting axially on the accumulation of material 26 from the contoured roller 36 that is moved in a controlled manner and from the built-up side of the radially outer tread rubber ply (cap), and the web 34 is formed in this way. Following that, on the axial side that is represented on the left in FIG. 8, the radially outer tread rubber ply (cap) 33 is helically wound on from the ribbon-shaped rubber strip 24 of suitable cap mixture, from the left-hand side of the breaker belt in the axial direction to the web 34, with overlapping of the neighboring turns.

Figure 9:
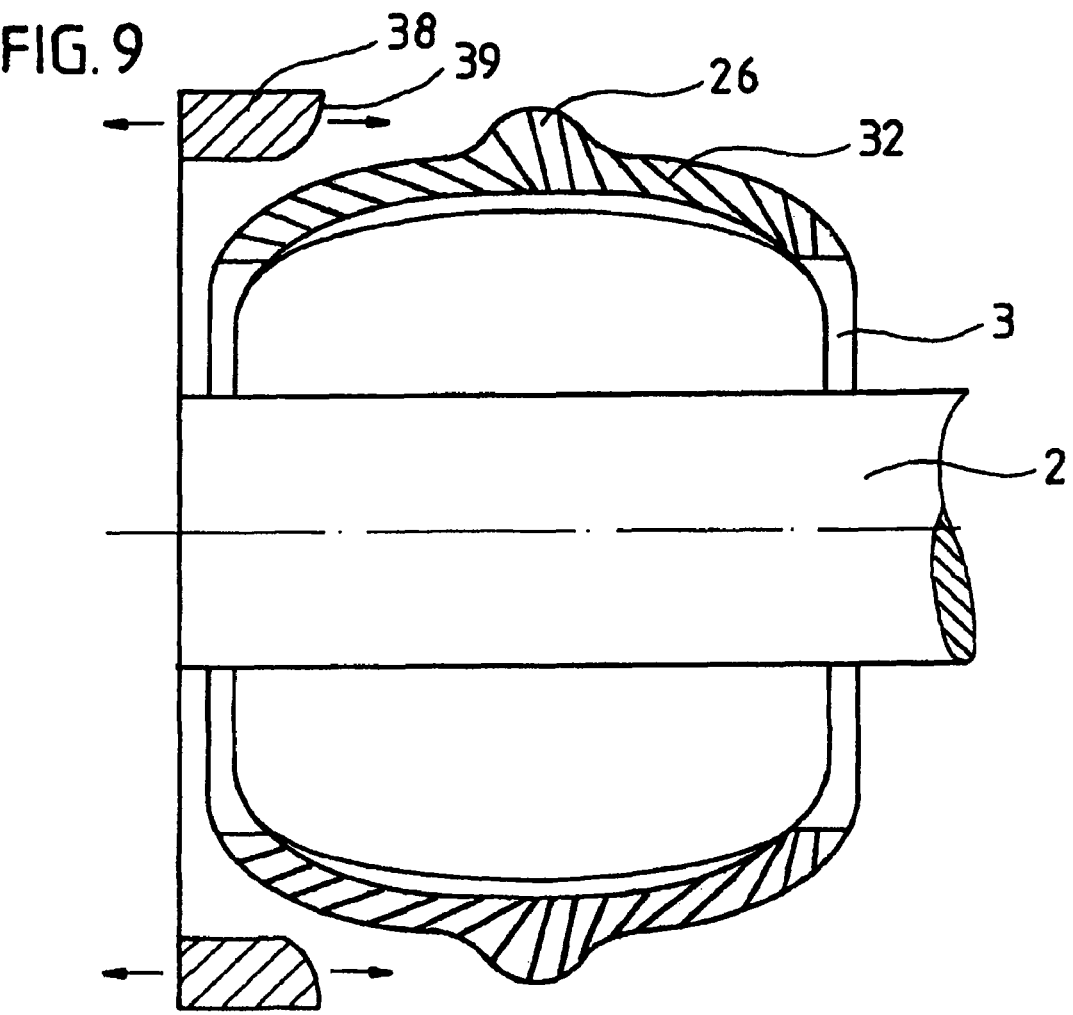
FIG. 9 shows a representation to explain the shaping of a web from the accumulation of material in a fourth embodiment.

FIG. 9 shows a further embodiment for the shaping of a web 34 from a produced accumulation 26—corresponding to the embodiments already explained—of the radially inner tread rubber ply (base) 32. In this case, after building up the inner tread rubber ply (base) 32 with an accumulation of material 26 concentrically in relation to the clamping head 2, a forming ring 38, which is formed on one end face with an end face contour 39 corresponding to the contour of a flank of the web 34 to be shaped, is moved with this end face axially in the direction of the accumulation of material 26. The contoured ring 38 is in this case formed in its inside diameter in such a way that it can be displaced with radial play over the outer contour of the built-up radially inner tread rubber ply (base) 32 in the axial region of extent outside the accumulation of material 26 up to the accumulation of material 26 and that the radial region of extent of the contoured end face 39 also takes up the radial region of extent of the web 34 that is to be formed. The contoured ring 38 is in this case pushed so far over the built-up radially inner tread rubber ply (base) 32 that the contoured end face 39 comes into contact with the accumulation of material 26 and deforms the accumulation of material 26 to such an extent that it is provided on the axial side facing the end face 39 with the contour profile of the flank of the web 34 that is to be formed. After that, the contoured ring 38 is removed again axially from the region of extent of the built-up radially inner tread rubber ply (base) 32. After that, the second axial side of the accumulation 26 is deformed into the desired contour of the second flank of the web by a correspondingly formed further contoured ring 38 (not represented), which is pushed over the green tire from the other axial side.

In another embodiment, the two contoured rings 38 and 39 are pushed over the green tire from the axial outside simultaneously, and consequently exert deforming forces on the accumulation of material 26 simultaneously from the two axial sides until the desired web is provided with the desired contour on both its flanks. After that, the two rings 38 are removed from the green tire outward in the axial sense. The radially outer tread rubber ply (cap) 33 is built up—as described in connection with FIG. 6c.

In another embodiment that is not represented, while the first contoured ring 38 is in contact with the accumulation of material 26, a contoured roller 35 has been brought up to the accumulation of material 26 instead of the second contoured ring 38 from the axial side of the accumulation of material 26 that is opposite from the first contoured ring—as explained in connection with FIG. 6b. Consequently, deforming forces are exerted on the accumulation of material 26 simultaneously from the two axial sides until the desired web is provided with the desired contour on both its flanks. After that, the contoured ring 38 and the contoured roller 35 are removed from the green tire outward in the axial sense. The radially outer tread rubber ply (cap) 33 is built up—as described in connection with FIG. 6c.

In another embodiment that is not represented, the radially inner rubber ply (base) 32 is built up as described in connection with FIG. 7a. After that, a contoured ring 38 is moved into the desired axial position of a web flank that is to be shaped. After that, the accumulation of material 26 in axial contact with the contoured surface 39 of the contoured ring 38 is wound onto by a number of turns arranged one on top of the other in the radial direction. After that—as explained in connection with FIG. 6b—a contoured roller 35 is brought up to the accumulation of material 26 from the axial side of the accumulation of material 26 that is opposite from the contoured ring 38, to the extent that the accumulation of material is shaped between the contoured ring 38 and the contoured roller 35. In this case, deforming forces are exerted on the accumulation of material 26 simultaneously from the two axial sides until the desired web is provided with the desired contour on both its flanks. After that, the contoured ring 38 and the contoured roller 35 are removed from the green tire outward in the axial sense. The radially outer tread rubber ply (cap) 33 is built up—as described in connection with FIG. 6c.

The green tire produced in this way, as in the various embodiments in connection with the embodiments explained with FIGS. 5 to 8, with a radially inner tread rubber ply (base) 32 and a radially outer tread rubber ply (cap) 33, with the web 34 made to extend through the radially outer tread rubber ply (cap) 33, is removed from the clamping head in a known way (not represented any more specifically) and fed to a vulcanizing press of a known type (not represented any more specifically), in which it is vulcanized while shaping the tread rubber profiling and the sidewall design.

Instead of the aforementioned clamping head 2, in an alternative way of producing the green tire it is also built up on a tire building drum of a known type for having the tread rubber and/or sidewalls wound on.

Figure 10A:
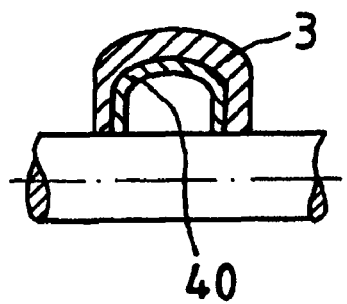
FIG. 10*a* shows a cross-sectional representation of a green tire built up on an expanded shaping bladder to explain the building up of the tread rubber.

As represented in FIG. 10*a*, in one embodiment the green tire 3 is built up on a toroidally expanded bladder 40, for example a shaping bladder, for having the tread rubber and/or sidewalls wound on. The winding operation for building up the tread rubber and/or the sidewalls takes place as explained in the aforementioned exemplary embodiments.

Figure 10B:
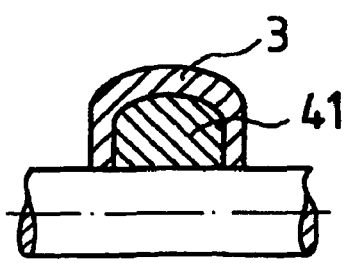
FIG. 10*b* shows a cross-sectional representation of a green tire built up on a toroidal core to explain the building up of the tread rubber.

As represented in FIG. 10*b*, in another embodiment the green tire 3 is built up on a toroidally formed fixed building core 41, for having the tread rubber and/or sidewall wound on. The winding operation for building up the tread rubber and/or the sidewalls takes place as explained in the aforementioned exemplary embodiments.

Figure 10C:
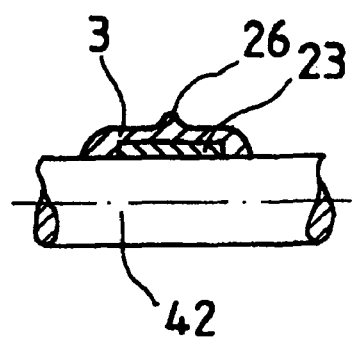
FIG. 10c shows a cross-sectional representation of a breaker belt assembly built up on a substantially cylindrical building drum to explain the building up of the tread rubber.

In the embodiment represented in FIG. 10*c*, the breaker belt plies of a breaker belt 23 are built up on a belt building drum 42 of a known type, with a substantially cylindrically formed radially outer surface. In the same way as explained in the embodiments with respect to FIGS. 5 to 9, the radially inner tread rubber ply (base) 32 and an accumulation of material 26 are wound onto the breaker belt 23 helically around the belt building drum 42. As explained in connection with FIGS. 5 to 9, a web 34 of the desired contour is shaped from the accumulation of material 36 and the radially outer tread rubber ply (cap) is helically wound on. The tread rubber/breaker belt assembly prefabricated in this way, comprising the breaker belt 23 and the tread rubber, is removed in a known way (not represented any more specifically) from the belt building drum 42 and laid onto a carcass assembly, which is built up on a carcass building drum of a known type (not represented) from the component parts for forming the bead region with the bead core, bead filler, bead reinforcing strip and other desired components for building up the bead region, the inner layer and the carcass ply, and is toroidally shaped, and said tread rubber/breaker belt assembly is connected to said carcass assembly in a known way.

In one embodiment, in the course of the production of the carcass assembly on a flat carcass building drum of a known type, the sidewalls are wound on the carcass with a winding head formed as explained with respect to FIGS. 2 to 4, or built up in a conventional way.

In another embodiment, after toroidal elevation and before joining together with the breaker belt assembly, the sidewall is wound onto the carcass in the way described in connection with the explanations with respect to FIGS. 2 to 4 or laid on in a conventional way.

In another alternative embodiment, after joining the tread rubber/breaker belt assembly together with the toroidally shaped carcass assembly, the sidewall is wound on in the way described in connection with the explanations with respect to FIGS. 2 to 4 or laid on in a conventional way.

The rubber mixture of high electrical conductivity that is used for the radially inner tread rubber ply (base) 32 and for forming the accumulation of material 26 is for example a rubber mixture that has after vulcanization a resistivity of no more than $10^6$ Ω·cm at 25° C. The rubber mixture of low electrical conductivity that is used for forming the radially outer tread rubber ply (cap) 33 is for example a rubber mixture that has after vulcanization a resistivity of $10^8$ Ω·cm at 25° C.

The axial position of the web 34 is chosen such that the web 34 is formed in the axial region of extent of radially raised profile elements, for example circumferential ribs or rows of profile blocks, of the intended tread rubber profile and is in definite contact with the road surface during the rolling of the pneumatic vehicle tire.

In one embodiment, instead of the aforementioned singly formed web 34, such a web 34 is formed in two or three different axial positions of the tread rubber profile.

In an embodiment that is not represented, the radially inner tread rubber ply (base) 22 of high electrical conductivity is formed by a number of plies arranged radially one on top of the other and respectively built up by the aforementioned winding technique.

In another embodiment that is likewise not represented, the radially outer tread rubber ply (cap) 33 of low electrical conductivity is formed by a number of plies arranged radially one on top of the other and respectively built up by the aforementioned winding technique.

In a further embodiment that is likewise represented, both the radially inner tread rubber ply (base) 32 of high electrical conductivity and the radially outer tread rubber ply (cap) 33 of lower electrical conductivity are respectively formed by a number of plies arranged radially one on top of the other and respectively built up by the aforementioned winding technique.

As can be seen in FIGS. 6*a* and 9, the accumulation of material 26 is already pre-contoured in the form of a mound or triangle by the winding technique used there for creating the accumulation of material 26. In another embodiment—as represented in FIG. 7—the accumulation of material 26 is formed with rectangular pre-contouring.

In the case of the embodiments described and represented in FIGS. 6, 7 and 9, during the winding on of the radially outer tread rubber ply (cap) 34 from a tire shoulder in the direction of the shaped web, in an alternative embodiment the contoured roller 36 used for shaping or the forming ring 38 that was used for shaping the web 34 from the axially opposite side has been left in contact with the web 34, so that, during the winding on of the radially outer rubber ply (cap) against the web 34, the web 34 is axially supported by the contoured roller 36 or the forming ring 38 from the axial side opposite from this winding on. After that, the radially outer tread rubber ply (cap) 33 is wound axially in the direction of the web from the opposite tire shoulder, wherein, during the winding on against the web 34, the latter is axially supported by the already wound-on side of the radially outer tread rubber ply (cap) 33.

Instead of the contoured rollers 35 and 36 mentioned for forming the contouring in the above embodiments, in an alternative embodiment contoured profiled rolls or contoured baffles are used.

In a further embodiment, a colored (yellow, red, green, blue) base rubber mixture of high electrical conductivity is used at least for building up the accumulation of material. In this way, the web formed in the finished pneumatic vehicle tire stands out as colored differently from the surrounding rubber material of the radially outer tread rubber ply (cap).

The web 34 is of a straight form in the circumferential direction of the pneumatic vehicle tire. In another embodiment, it may be of a wavy form along the circumferential extent. This is possible by controlled forming of the profiled rolls, profiled rollers or baffles used for the configuration of the web 34, with changed pressing force over the circumference of the green tire.

The cross section of the web 34 is formed such that it is symmetrically triangular in its base contour and perpendicular to the inner tread rubber ply (base) 32, with a degressively decreasing axial extent in the radial direction from the inside outward—as represented above. In another embodiment, the base contour is a rectangular parallelogram or mushroom-shaped, depending on the individually desired profile to be contoured.

As represented in FIG. 8, in another embodiment the web is not formed perpendicular to the inner tread rubber ply (base) 32, but with a deliberately obliquely inclined contouring.

In a further embodiment, after building up of the cap, the web radially reaches slightly beyond the radial extent of the cap and is rolled on the radial outer surface of the cap by non-illustrated pressing rollers.

The invention claimed is:

1. A method of producing a tread for a vehicle tire, the tread having:
 a radially outer rubber layer formed of a first rubber material;
 a radially inner rubber layer formed of a second rubber material;
 an electrically conductive layer disposed axially inside a portion of the radially outer rubber layer, the electrically conductive layer extending from the radially inner rubber layer up to a ground contact surface of the tread; and
 a rubber material of the electrically conductive layer and the second rubber material of the radially inner rubber layer having a higher electrical conductivity than the first rubber material of the radially outer rubber layer; and
 the method which comprises the following steps:
 building up a first rubber layer of a relatively higher electrical conductivity, formed to extend over a circumference of the vehicle tire and having a radially outer surface, and building up an accumulation of rubber material of a relatively higher electrical conductivity, formed to extend over the circumference of the vehicle tire and positioned in a region of axial extent of the layer of rubber material of higher electrical conductivity intended to extend up to the ground contact surface in the finished vehicle tire;
 subsequently shaping the accumulation of rubber material of higher electrical conductivity to form a web extending over the circumference of the vehicle tire, radially outward from the radially outer surface of the first rubber layer, and having, in its cross-sectional planes that contain an axis of the vehicle tire, a predetermined cross-sectional contour;
 subsequently building up a second rubber layer from a material of relatively lower electrical conductivity on the radially outer surface of the first rubber layer, adjoining the shaped web of rubber material axially on both sides; and
 shaping and vulcanizing a tread profile of the vehicle tire.

2. The method according to claim 1, wherein the step of shaping the accumulation of rubber material of higher electrical conductivity comprises forming the web with a cross-sectional contour tapering outwardly in a radial sense in its cross-sectional planes containing the axis of the vehicle tire.

3. The method according to claim 2, which comprises shaping the tapering of the cross-sectional contour profile to taper degressively from the inside outwardly in the radial sense.

4. The method according to claim 1, wherein the step of shaping the accumulation of rubber material of higher electrical conductivity to form a web extending over the circumference of the vehicle tire radially outward from the radially outer surface of the first rubber layer comprises shaping a web with a conically widening contour, defined by a cross-sectional contour profile of one or both axial side faces of the web from the outside inward in the axial sense.

5. The method according to claim 1, wherein the step of building up the accumulation of rubber material of higher electrical conductivity is performed during the building up of the first rubber layer of higher electrical conductivity, formed such that it extends over the circumference of the vehicle tire.

6. The method according to claim 1, which comprises building up the accumulation of material and the first rubber layer from a common rubber material of higher electrical conductivity.

7. The method according to claim 1, which comprises building up the material on a building surface of a building body drivable in a rotational manner about an axis of rotation, and rotating the building body during the build-up.

8. The method according to claim 7, wherein the building body is a building drum.

9. The method according to claim 7, wherein the building body is a toroidal building core.

10. The method according to claim 7, which comprises forming the building surface substantially cylindrically in relation to the axis of rotation.

11. The method according to claim 7, wherein the building surface is toroidal.

12. The method according to claim 7, wherein the building surface is part of a solid surface.

13. The method according to claim 7, wherein the building surface is part of an elastic surface.

14. The method according to claim 13, wherein the building surface is a surface of an inflated bladder.

15. The method according to claim 1, wherein the step of building up the first rubber layer comprises winding on a ribbon-shaped rubber strip with a plurality of turns arranged axially next to one another or at least partly axially overlapping one another.

16. The method according to claim 1, wherein the step of building up the second rubber layer of lower electrical conductivity comprises winding on a ribbon-shaped rubber strip with a plurality of turns arranged axially next to one another or at least partly axially overlapping one another.

17. The method according to claim 1, wherein the step of building up the accumulation of material comprises winding on a ribbon-shaped rubber strip with a plurality of turns.

18. The method according to claim 1, wherein the first rubber layer of higher electrical conductivity is built up radially outside on a built-up carcass ply.

19. The method according to claim 18, wherein the carcass ply is toroidally built and is of radial-type construction.

20. The method according to claim 1, which comprises building up the first rubber layer radially outside a breaker belt ply built up radially outside a carcass ply.

21. The method according to claim 20, wherein the carcass ply is a toroidal carcass ply and the breaker belt ply is an assembly comprising one or more breaker belt plies and a breaker belt bandage.

22. The method according to claim 1, wherein the shaping of the accumulation of material comprises bringing up a shaping body laterally to a flank of the accumulation of material to be shaped and deforming the accumulation of material to form a desired contour of the flank of the web to be shaped.

23. The method according to claim 22, wherein the shaping body is a contoured shaping body.

24. The method according to claim 22, wherein the shaping body is a baffle and the method comprises moving the accumulation of material along the baffle after the baffle has been brought up to the material.

25. The method according to claim 22, wherein the shaping body is a forming roller and the method comprises moving the accumulation of material along the forming roller after the roller has been brought up to the material.

26. The method according to claim 22, wherein the shaping body is a forming ring brought up to the accumulation of material coaxially and radially outside the first rubber layer, the forming ring using an annular stop to deform the accumulation of material over the entire circumference of the first rubber layer.

* * * * *